United States Patent [19]

Kimura et al.

[11] 3,972,885
[45] Aug. 3, 1976

[54] OXYQUINOPHTHALONE COLORING MATERIAL

[75] Inventors: Yoshio Kimura; Kiyoshi Himeno, both of Kitakyushu, Japan

[73] Assignee: Mitsubishi Chemical Industries Ltd., Tokyo, Japan

[22] Filed: Aug. 23, 1973

[21] Appl. No.: 390,849

Related U.S. Application Data

[63] Continuation-in-part of Ser. No. 171,355, Aug. 12, 1971, abandoned.

[30] Foreign Application Priority Data

Aug. 14, 1970 Japan.............................. 45-71280

[52] U.S. Cl............................. 260/289 GP; 8/1 D; 260/287 H; 260/289 R
[51] Int. Cl.$^2$........................................ C09B 25/00
[58] Field of Search.................. 260/289 QP, 289 R

[56] References Cited
UNITED STATES PATENTS

| | | | |
|---|---|---|---|
| 3,293,246 | 12/1966 | Fuchs et al. | 260/289 QP |
| 3,655,672 | 4/1972 | Spietchka et al. | 260/289 QP |
| 3,793,330 | 2/1974 | Kalz et al. | 260/289 QP |

FOREIGN PATENTS OR APPLICATIONS

| | | | |
|---|---|---|---|
| 733,604 | 5/1969 | Belgium | 260/289 |
| 733,605 | 5/1969 | Belgium | 260/289 |
| 1,229,663 | 12/1966 | Germany | 260/289 QP |
| 1,769,436 | 3/1971 | Germany | 260/289 |
| 1,769,437 | 3/1971 | Germany | 260/289 |
| 4,820,476 | 6/1973 | Japan | 260/289 QP |
| 1,036,389 | 7/1966 | United Kingdom | 260/289 |
| 1,091,734 | 11/1967 | United Kingdom | 260/289 QP |

*Primary Examiner*—Alton D. Rollins
*Assistant Examiner*—Mary C. Vaughn
*Attorney, Agent, or Firm*—Oblon, Fisher, Spivak, McClelland & Maier

[57] ABSTRACT

An oxyquinophthalone coloring material having the general formula

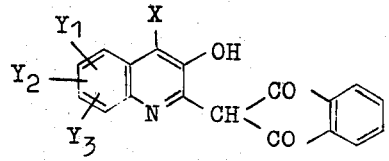

wherein X represents chlorine or bromine atom and $Y_1$, $Y_2$ and $Y_3$ represent respectively hydrogen, chlorine, bromine, methyl, ethyl, methoxy or ethoxy group, at least one of $Y_1$, $Y_2$ and $Y_3$ being chlorine or bromine and one of $Y_1$, $Y_2$ and $Y_3$ being methyl, ethyl, methoxy and ethoxy group.

15 Claims, No Drawings

OXYQUINOPHTHALONE COLORING MATERIAL

This invention is a continuation-in-part of Ser. No. 171,355 filed on Aug. 12, 1971, now abandoned.

This invention relates to water-insoluble yellow coloring material, and to a process using it for coloring thermoplastic shaped articles.

Various yellow coloring compounds suitable for coloring synthetic polymeric material have been proposed. Oxyquinophthalone coloring material is widely used in view of its good light resistance and brilliant shade, but it has one disadvantage — poor resistance to sublimation.

Accordingly, an object of this invention is to provide coloring material having good fastness, especially to sublimation and to washing and improved affinity to a synthetic fiber.

Another object of this invention is to provide a process for coloring thermoplastic materials, such as polyester, polyamide, polyacrylic and cellulose ester fibers and shaped articles of thermoplastic resins.

The coloring materials of this invention are oxyquinophthalone derivatives represented by general formula (I):

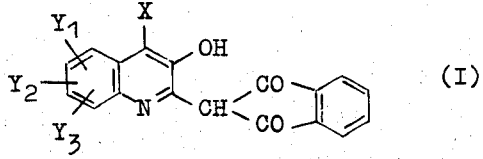

wherein X represents chlorine or bromine atom and $Y_1$, $Y_2$ and $Y_3$ represent respectively hydrogen, chlorine, bromine, methyl, ethyl, methoxy or ethoxy group, at least one of $Y_1$, $Y_2$ and $Y_3$ being chlorine or bromine and one of $Y_1$, $Y_2$ and $Y_3$ being methyl, ethyl, methoxy or ethoxy group.

The coloring materials represented by general formula (I) include, for example,
3-hydroxy-4-bromo-6-methoxy-5(or 7)-chloroquinophthalone,
3-hydroxy-4-bromo-6-methyl-5(or 7)-bromoquinophthalone,
3-hydroxy-4-chloro-6-methoxy-5(or 7)-chloroquinophthalone,
3-hydroxy-4-bromo-6-ethoxy-5(or 7)-chloroquinophthalone,
3-hydroxy-4-bromo-6-ethyl-7(or 8)-bromoquinophthalone,
3-hydroxy-4,8-dibromo-6-methylquinophthalone,
3-hydroxy-4-bromo-6,8-dimethylquinophthalone,
3-hydroxy-4,8-dibromo-6-ethylquinophthalone,
3-hydroxy-4,5(or 4,7)-dichloro-6-methoxyquinophthalone,
3-hydroxy-4,5(or 4,7)-dichloro-6-ethoxyquinophthalone and
3-hydroxy-4-bromo-6,8-dimethyl-5(or 7)-bromoquinophthalone.

The coloring materials represented by general formula (I) are prepared by reacting phthalic acid, phthalic anhydride or a derivative thereof with a quinaldine compound represented by general formula (II).

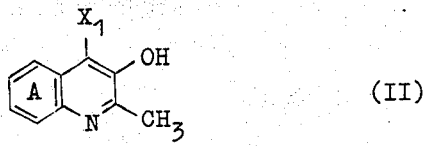

wherein $X_1$ represents hydrogen, chlorine or bromine atom or carboxylic group and nucleus A represents a benzene nucleus having up to two substituents which are one or two of from chlorine or bromine atom or methyl, ethyl, methoxy or ethoxy group, and the reaction product may further be subjected to halogenation.

Typical examples of the quinaldine compound represented by general formula (II) include, for example,
3-hydroxy-6-methoxyquinaldine-4-carboxylic acid,
3-hydroxy-6-methylquinaldine-4-carboxylic acid,
3-hydroxy-5(or 7)-methylquinaldine-4-carboxylic acid,
3-hydroxy-6-ethoxyquinaldine-4-carboxylic acid,
3-hydroxy-6,8-dimethylquinaldine-4-carboxylic acid,
3-hydroxy-6,8-dimethoxyquinaldine-4-carboxylic acid,
3-hydroxy-6-methoxy-5(or 7)-chloroquinaldine-4-carboxylic acid,
3-hydroxy-6-methoxy-5(or 7)-bromoquinaldine-4-carboxylic acid,
3-hydroxy-6-methyl-8-chloroquinaldine-4-carboxylic acid,
3-hydroxy-6-methyl-8-bromoquinaldine-4-carboxylic acid,
3-hydroxy-6-methoxy-8-chloroquinaldine-4-carboxylic acid,
3-hydroxy-6-methoxy-8-bromoquinaldine-4-carboxylic acid,
3-hydroxy-6-methylquinaldine,
3-hydroxy-4-chloro-6-methylquinaldine and
3-hydroxy-4-bromo-6-methylquinaldine.

The reaction of the quinaldine compound with phthalic acid, phthalic anhydride or phthalimide is carried out in the presence or absence of an inert organic medium or a solvent at an elevated temperature. The mediums employed according to this invention include, for example, o-dichlorobenzene, trichlorobenzene, o-nitrotoluene and nitrobenzene. The solvent is used in an amount of 3 to 10 times by weight of the quinaldine compound and in this reaction the phthalic compound is used in an amount of 1.0 to 1.5 moles per mole of the quinaldine compound. If the reaction is carried out in the absence of solvent, it is preferable to use a molar excess of the phthalic compound.

The temperature at which the reaction is effected ranges from 120° to 260°C, but preferably is within the range 170° to 230°C; if the temperature is below 120°C it results in low reaction rate and a long reaction time is required.

Upon completion of the reaction, the reaction system is permitted to cool and the precipitate thus formed is filtered out. Preferably the system is diluted with a diluent such as methanol, ethanol and propanol; then the precipitate is filtered out to obtain the desired product. Alternatively, an excess of solvent is removed from the reaction mass by steam distillation and the precipitate so formed is recovered.

If a quinaldine compound in which substituent $X_1$ is hydrogen atom or carboxylic group is employed as the raw material, a coloring material in which the substituent X is hydrogen atom is produced; while if $X_1$ is a halogen atom then X is a halogen atom.

The quinophthalone compound thus obtained may be halogenated. The reaction mass containing quinophthalone compound or a slurry of the quinophthalone compound in an inert medium is subjected to a conventional halogenation treatment.

The inert mediums which can be employed in the halogenation include, for example, an aromatic liquid such as chlorobenzene, o-dichlorobenzene, trichlorobenzene, nitrobenzene and o-nitrotoluene and an acid, for example, a mineral acid such as sulfuric acid and an organic acid such as acetic acid. The amount of the medium is 3 to 10 times by weight for the quinophthalone compound to be halogenated. The halogenating agents include, for example, a halogen such as chlorine and bromine, a halide such as phosphorus trichloride and a thio compound of halogen such as thionyl chloride and sulfuryl monochloride; chlorine or bromine is preferable as the halogenating agent. The halogenation is carried out at a temperature of 40° to 180°C, preferably 60° to 160°C. In the halogenation of the oxyquinophthalone compound, when X in general formula (II) is a hydrogen atom, a halogen atom is preferantially introduced into the 4-position of the quinaldine nucleus then into 5-, 6-, 7- or 8-position, while when 5-, 6-, 7- or 8-position has already been occupied by a halogen atom no further halogenation is effected; however, when an alkyl or alkoxy group is substituted at the 5-, 6-, 7- or 8-position, a halogen atom is readily introduced into the nucleus.

The quinophthalone compound having general formula (I) thus obtained is suitable for coloring various synthetic polymeric materials, especially a polyester fiber, a cellulose ester fiber and a shaped article of a thermoplastic resin in yellow shade with good fastnesses, especially to light and sublimation. Further, a fabric dyed using the coloring material according to this invention is subjected to a resin finishing, then fastness to washing is remarkably improved. The coloring material can withstand the high temperatures at which shaped articles are produced; thus, there is no discoloration.

The polymeric materials to be colored with the coloring material according to this invention include, for example, shaped articles and fibers made of polyester such as polyethylene glycol terephthalate, cellulose ester such as cellulose acetate and cellulose triacetate, polyamide and polyacrylic resin; and shaped articles made of a thermoplastic resin, such as polyvinyl chloride, polystyrene, acrylonitrile-styrene copolymer and acrylonitrile-butadiene-styrene copolymer.

The coloring material according to this invention can be used alone or in the form of a mixture of two or more. Further the coloring material can be used in a mixture comprising 3-hydroxyquinophthalone or its 4- and/or 6- halogeno, -alkyl or -alkoxy derivative. The 3-hydroxyquinophthalone derivatives which can be used together with the coloring materials of this invention include, for example,
3-hydroxy-4-bromoquinophthalone,
3-hydroxy-6-bromoquinophthalone,
3-hydroxy-4,6-dibromoquinophthalone,
3-hydroxy-6-methylquinophthalone and
3-hydroxy-6-methyloxyquinophthalone.

The coloring material according to this invention is dispersed in an aqueous medium to prepare dye bath or printing paste which can be used for dyeing or printing synthetic fiber by a conventional process.

In the preparation of a dye bath or printing paste a dispersant is added, such as condensate of naphthalene sulfonic acid and formaldehyde, condensate of naphthol sulfonic acid, cresol and formaldehyde, lignin sulfonate, sulfuric ester of higher alcohol and higher alkylbenzene sulfonate. If desired, a carrier such as a phenolic compound, a chlorobenzene, an oxybenzoic acid, an alkyl naphthalene and an ester of aromatic carboxylic acid may be incorporated in the dye bath and printing paste.

The dye bath is prepared in an appropriate dye concentration by dispersing the coloring material in an aqueous medium. The dyeing of synthetic fiber is carried out at a temperature of 120° to 130°C for 60 to 120 minutes and the dyed material is soaped in a conventional way. When the carrier is incorporated, dyeing is effected at 80° to 100°C for 60 to 120 minutes.

The coloring of a shaped article of synthetic resin is effected through various procedures.

The coloring material represented by general formula (I) in finely divided form is mixed with pellets or beads of thermoplastic resin and, if desired, additive such as heat and light stabiliser and lubricant, in a suitable mixer, then the mixture is subjected to shaping process, such as injection, extrusion and blow molding. The shaping temperature varies depending upon the resin and shaping process employed and generally ranges between 150° and 300°C. The coloring material can be added to a polymerization system containing one or more monomers and initiator or catalyst for polymerization and after completion of polymerization the plasticized or molten material is subjected to molding process. Alternatively, the coloring material is compounded of a small amount of synthetic resin to form a master coloring batch.

The coloring material according to this invention possesses an improved affinity to synthetic polymeric materials, and further synthetic fiber or shaped materials colored with the coloring material resist to light, to sublimation and to washing and are superior to articles or fibers prepared with similar prior art coloring material, as illustrated in the following Tables. Further, when the coloring material according to this invention is used for shaping synthetic resin, there are few or no spot of coloring material left on the inside wall of the apparatus; thus, the commercial value of this invention is clear.

Various fibers are dyed using the coloring materials according to this invention and of prior art. The results are given in Tables I and II.

The dyeing procedures are the same as in Example 1 but using dye concentration of 2% o.w.f.

Fastness to light is measured according to Japan Industrial Standard (JIS) L-1044 (1959) using Fade-O-Meter, fastness to sublimation is measured by an iron tester at 180°C for 30 seconds.

Percentage of exhaustion is determined as follows:

A fabric made of poly(ethylene terephthalate) textured yarn is dyed in a dyebath containing 0.4% o.w.f. of dyestuff at 130°C for 60 minutes. The dyed fabric is extracted with dimethyl formamide and the amount of dye extracted is measured through spectrophothometer $$\text{Percentage of exhaustion} = \frac{\text{The Amount of dye extracted}}{\text{The Amount of dye used}} \times 100$$

Fastness to washing is measured using fabric treated as follows and according to AATCC II-A method using white pieces of polyamide fabric and cellulose acetate fabric to be stained.

Fabric made of poly(ethylene terephthalate) textured yarn is dyed in a dyebath containing 0.8% o.w.f.

of dyestuff at 130°C for 60 minutes, the dyed fabric is subjected to resin finishing treatment as follows:

Resin employed is Sumitex Resin available from Sumitomo Chemical Company Ltd., Osaka, Japan. The dyed fabric is padded in a solution containing 10 g of the resin per 1 liter, squeezed to 70% pick up, dried at 100°C for 5 minutes and cured at 150°C for 3 minutes.

Table I

| Sample | Structure | Fastness to light | Fastness to sublimation |
|---|---|---|---|
| 1 | (quinoline-OH with CH linked to phthaloyl) | 2 ~ 3 | 5 ~ 6 |
| 2 | 6-Cl quinoline-OH with CH linked to phthaloyl | 3 | 5 |
| 3 | 4-Br quinoline-OH with CH linked to phthaloyl | 3 | 5 ~ 6 |
| 4 | quinoline-OH with CH linked to 4-Cl-phthaloyl | 3 | 5 ~ 6 |
| 5 | 6-H$_3$CO, 8-Cl, 4-Br quinoline-OH with CH linked to phthaloyl | 4 ~ 5 | 6 |
| 6 | 6-H$_3$C, 8-Br, 4-Br quinoline-OH with CH linked to phthaloyl | 4 ~ 5 | 6 |

Note:
Samples 1 to 4: prior coloring material
Samples 5 to 6: coloring material according to this invention Table II

| Sample | Structure | Percentage of exhaustion | Fastness to washing nylon | Fastness to washing cellulose acetate |
|---|---|---|---|---|
| 7 | 6-H$_3$C, 8-Br, 4-Br quinoline-OH with CH linked to phthaloyl | 93 | 4 | 4 ~ 5 |

Table II-continued

| Sample | Structure | Percentage of exhaustion | Fastness to washing nylon | Fastness to washing cellulose acetate |
|---|---|---|---|---|
| 8 | [structure: 6-methyl-8-bromo-4-chloro-3-hydroxyquinophthalone] | 87 | 4 | 5 |
| 9 | [structure: 6-methyl-8-bromo (CH3)-4-bromo-3-hydroxyquinophthalone] | 83 | 4 | 4 ~ 5 |
| 10 | [structure: 6-methyl-8-chloro-3-hydroxyquinophthalone] | 75 | 3 | 2 ~ 3 |
| 11 | [structure: 5,7-dichloro-4-bromo-3-hydroxyquinophthalone] | 78 | 2 ~ 3 | 3 |
| 12 | [structure: 6-chloro-4-bromo-3-hydroxyquinophthalone] | 73 | 2 | 2 ~ 3 |

Note:
Samples 7 to 9: coloring material according to this invention
Samples 10 to 12: coloring material for comparison This invention will be illustrated referring to the following Examples, however, it should be understood that the Examples are given for the purpose of explanation and are not intended to limit the scope of this invention. In the Examples, "λmax" means wave length of maximum absorption measured in acetone solution and "part" is given by weight unless otherwise specified. The fastness to light is measured according to JIS L-1044 (1959) by using Fade-O-Meter and the fastness to sublimation is measured by an iron tester at 180°C for 30 seconds for polyester fiber, at 120°C for 5 hours for acetate fiber and at 150°C for 3 minutes for polyamide fiber.

EXAMPLE 1

In a three-neck flask equipped with a stirrer, 12 parts of a mixture of 3-hydroxy-6-methoxy-5-chloroquinophthalone and 3-hydroxy-6-methoxy-7-chloroquinophthalone dissolved in 100 parts of o-dichlorobenzene was brominated with 5.3 parts of bromine at a temperature of 150° – 160°C to obtain a mixture (λ max. being 447 mμ) of compounds having the structures:

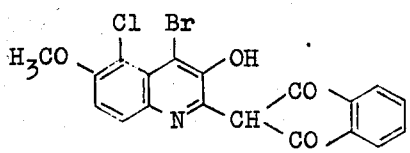

and

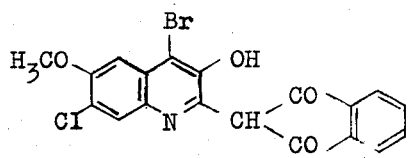

One part of the dyestuff thus obtained was dispersed in 3000 parts of water containing 2 parts of condensate of naphthalene sulfonic acid and formaldehyde and 4 parts of sulfuric ester of higher alcohol to prepare a dye bath.

In the dye bath 100 parts of polyester fiber was dyed at 130°C for 60 minutes, washed with water and soaped with 3000 parts of water containing 4 parts of sulfuric ester of higher alcohol at 90°C for 20 minutes. The dyed fiber was brilliant yellow and had a fastness to light of 6 and a fastness to sublimation of 4 – 5.

EXAMPLE 2

Into a rotary closed vessel, 0.2 part of the finely divided dyestuff prepared according to Example 1 and 100 parts of polystyrene pellets were charged and mixed together at room temperature by rotating the vessel to spread the dyestuff particles on the surface of the pellets. The pellets were treated with a screw type extruder, the outlet of which was provided with a rotary cutter, at a barrel temperature of 200°C to obtain colored granules. The colored granules were melted in an injection molding machine at a temperature of 245° – 250°C and injected into a mold maintained at 70°C to produce a disk of 5 cm in diameter and 0.3 cm in thickness.

In the molding operation, no discoloration of the coloring material and no spot of the coloring material on the inside wall of the machine were observed. The disk had good resistance to light and heat.

EXAMPLE 3

A mixture of 50 parts of trichlorobenzene, 10 parts of 3-hydroxy-6-methoxy-8-chloroquinaldine-4-carboxylic acid and 8.4 parts of phthalic anhydride were heated at 200°C for 3 hours with agitation and under refluxing. Upon completion of the reaction, the reaction mass was allowed to cool with agitation and the precipitates so formed were filtered off, washed with 50 parts of methanol followed by 500 parts of water and dried to obtain 10.2 parts of dark orange product.

Ten parts of the product was mixed with 50 parts of o-dichlorobenzene and heated to 150°C at which 4.5 parts of bromine was added dropwise to the mixture and the bromination was continued for additional one hour. The reaction mass was allowed to cool to room temperature and the precipitates were filtered off, washed with methanol and water and dried as above to obtain 11 parts of yellow crystals which had a melting point of 311° – 313°C, a λ max. of 447 mμ and an elementary analysis of:

|  | C (%) | H (%) | N (%) |
|---|---|---|---|
| Calculated | 52.80 | 2.54 | 3.23 |
| Found | 52.41 | 2.37 | 3.01 |

These values conform with those of a compound having the structure of:

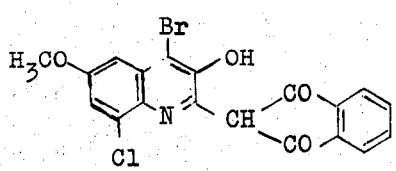

The product thus obtained was finely divided and used for dyeing polyester fiber according to the procedures described in Example 1. The dyed material was brilliant yellow and had a fastness to light of 6 and a fastness to sublimation of 4 – 5.

A colored polystyrene disk was prepared according to the procedures in Example 2 using 0.2 part of the coloring material and 100 parts of polystyrene pellets. The disk was clear and brilliant yellow with high resistance to light and to weather. In the molding operation, no discoloration of the coloring material was observed.

EXAMPLE 4

Twelve parts of 3-hydroxy-6-methylquinophthalone in 100 parts of o-dichlorobenzene was reacted with 10.0 parts of bromine at a temperature of 150° – 160°C to obtain a compound having a λ max. of 452 mμ and the structure of:

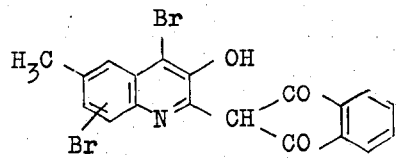

One part of the coloring material thus obtained was dispersed in 3000 parts of water containing 3 parts of condensate of naphthalene sulfonic acid and formaldehyde and 5 parts of Marseille soap to prepare a dye bath. In the dye bath, 100 parts of cellulose acetate fiber was dyed at 80°C for 60 minutes, and washed with water, soaped with 3000 parts of water containing 5 parts of Marseille soap and dried to obtain brilliant yellow fiber with a fastness to light of 6 and a fastness to sublimation of 4 – 5.

This coloring material was used for dyeing polyester fiber according to the procedures as in Example 1. Brilliant yellow fiber was obtained and its fastnesses to light and to sublimation were 6 and 4 – 5, respectively.

EXAMPLE 5

Polymethylmethacrylate pellets and 1% by weight of coloring material of Example 4 were blended in a rotary vessel at room temperature for 60 minutes as in Example 2. The pellets thus treated were melted and extruded through an extruder at a barrel temperature of 200°C to form a master color batch.

Ten parts of the master color batch and 100 parts of polymethylmethacrylate were melted at a temperature of 180° – 200°C in a screw type extruder provided with a rotary cutter at the outlet end to obtain colored granules. The granules were subjected to injection molding according to the procedure in Example 2 to produce a clear and yellow molding which was excellent in resistances to light and heat. During and after the molding operation, no spot of coloring material due to its sublimation was observed on the inside wall of the molding machine.

EXAMPLE 6

An intimate mixture of 15 parts of 3-hydroxy-6,8-dimethylquinaldine-4-carboxylic acid and 15 parts of phthalic anhydride was heated slowly to a temperature of 240°C at which temperature the reaction was continued for 4 hours. The reaction mass was allowed to cool to room temperature, and milled into finely divided particles which were then extracted with 1000 parts of 3% aqueous sodium hydroxide solution. The extract was brought into acidic condition by addition of concentrate hydrochloric acid to precipitate the desired product which was then filtered off and dried. Yellow crystals (m.p. 278° – 280°C) were obtained in an amount of 14.2 parts and identified as 3-hydroxy-6,8-dimethylquinophthalone.

Ten parts of the product was added to 30 parts of trichlorobenzene and the mixture was heated to 150°–160°C at which temperature 2.5 parts of chlorine was sparged over two hours and then chlorination was effected for an additional 2 hours. The reaction mass was allowed to cool and the precipitates thus formed were filtered off, washed with methanol and water and dried to obtain 10.5 parts of yellow product.

The product had a λ max. of 446 mμ and an elementary analysis of:

|  | C (%) | H (%) | N (%) | Cl (%) |
|---|---|---|---|---|
| Calculated | 68.25 | 4.00 | 4.00 | 10.01 |
| Found | 68.43 | 4.14 | 3.88 | 9.53 |

These values correspond to those of a compound having the structure of

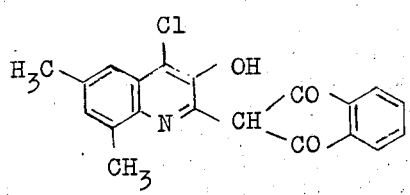

The product was milled into finely divided particles and used for dyeing polyester fiber according to the procedures in Example 1 to obtain brilliant yellow fiber with a fastness to light of 6 and a fastness to sublimation of 4.

EXAMPLE 7

The coloring material used in this Example had a λ max. of 449 mμ and a structure of

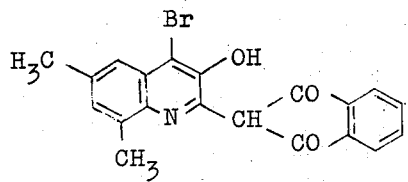

and was prepared by reacting in trichlorobenzene 5 parts of 3-hydroxy-6,8-dimethylquinaldine-4-carboxylic acid with 4.5 parts of phthalic anhydride followed by brominating with bromine.

The dyeing procedures described in Example 1 were repeated for dyeing 100 parts of polyester fiber except that one part of the above coloring material was employed. The dyed material was brilliant yellow and had a fastness to sublimation of 4.

EXAMPLE 8

Using the coloring material of Example 7 and repeating the procedures in Example 5, polymethylmethacrylate was colored and injected to produce a disk of clear and brilliant yellow. During the operation, no discoloration was observed and the number of spots formed on the inside wall of the apparatus was less than found when using 3-hydroxy-4-bromoquinophthalone, which is similar to the coloring material of this invention.

EXAMPLE 9

Two and half parts of 3-hydroxy-4-bromo-6,8-dimethylquinophthalone was dissolved in 10 parts of o-dichlorobenzene at 150°C; at that temperature 1.3 parts of bromine was added dropwise to the solution over 1 hour and the bromination was then carried out for 30 minutes with agitation. The reaction mass was allowed to cool to room temperature, and precipitates so formed were filtered off, washed with methanol following by water and dried. Yellow crystals were obtained in an amount of 2.8 parts and having λ max. of 455 mμ, a melting point of 281° – 285°C and an elementary analysis of

|  | C (%) | H (%) | N (%) | Br (%) |
|---|---|---|---|---|
| Calculated | 50.55 | 2.76 | 2.95 | 33.65 |
| Found | 49.61 | 2.2 | 2.4 | 34.84 |

These values correspond to those of compound of

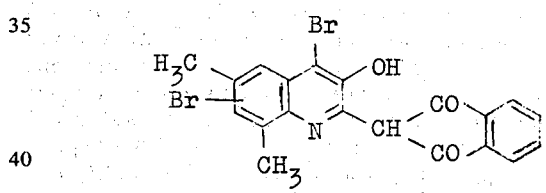

(wherein one of the bromine atoms was substituted at 4-position but the substitution position of the other was not identified).

The coloring material so produced was used for dyeing polyester fiber according to the procedures in Example 1 to obtain brilliant yellow fiber with fastness to light of 6 and to sublimation of 4 to 5.

EXAMPLES 10 – 13

Various coloring materials given in the following Table were used for coloring various synthetic fibers and synthetic resins. The results obtained are also given in the Table III.

Table III

| Example No. | Structure | λ max. (mμ) | Material to be colored | Shade | Fastness to light | to sublimation |
|---|---|---|---|---|---|---|
| 10 | ![structure with H5C2O, Br, OH, Cl, N, CH, CO] | 456 | Polyester fiber | Yellow | 4 | 6 |

Table III-continued

| Example No. | Structure | λ max. (mμ) | Material to be colored | Shade | Fastness to light | Fastness to sublimation |
|---|---|---|---|---|---|---|
| 11 | (structure with Br, H₃C₂, OH, Br, CO/CO phthalimide) | 453 | Polyester fiber & ABS resin | " | 4 | 6 |
| 12 | (structure with H₃CO, Cl, OH, Cl, CO/CO) | 449 | Cellulose acetate fiber | " | 4 | 6 |
| 13 | (structure with H₅C₂O, Cl, OH, Cl, CO/CO) | 450 | Polyester fiber | " | 4 | 6 |

EXAMPLES 14 – 16

Various quinaldine compounds given in the following Table were reacted with phthalimide followed by halogenated to obtain coloring materials which were used for dyeing polyester fiber.

The structure and properties of the coloring materials and properties of the dyed polyester fiber are also given in the Table IV.

Table IV

| Ex. No. | Quinaldine compound | Halogenation | Product* | λmax. (mμ) | Fastness to light | Fastness to sublimation |
|---|---|---|---|---|---|---|
| 14 | (COOH, CH₃, OH, Br quinaldine) | Bromination | (Br, H₃C, OH, Br, CO/CO) | 452 | 4~5 | 6 |
| 15 | (COOH, CH₃, OH, Br quinaldine) | Chlorination | (Cl, H₃C, OH, Br, CO/CO) | 451 | 4~5 | 6 |
| 16 | (H₃C, OH, CH₃ quinaldine) | Bromination | (Br, H₃C, OH, Br, CO/CO) | 453 | 4~5 | 6 |

*Shade: Yellow

What is claimed is:

1. A coloring material having the formula:

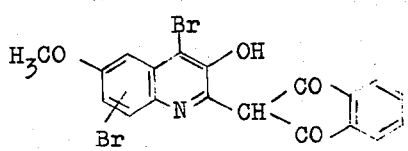

2. A coloring material having the formula:

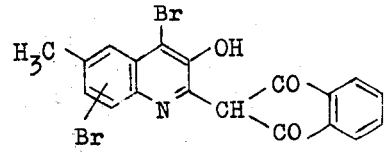

3. 3-Hydroxy-4-bromo-6-methoxy-5-chloroquinophthalone.
4. 3-Hydroxy-4-chloro-6-methoxy-5-chloroquinophthalone.
5. 3-Hydroxy-4-bromo-6-ethoxy-5-chloroquinophthalone.
6. 3-Hydroxy-4-bromo-6-ethyl-7-bromoquinophthalone.
7. 3-Hydroxy-4,8-dibromo-6-methylquinophthalone.
8. 3-Hydroxy-4,8-dibromo-6-ethylquinophthalone.
9. 3-Hydroxy-4,5-dichloro-6-ethoxyquinophthalone.
10. 3-Hydroxy-4-bromo-6,8-dimethyl-5-bromoquinophthalone.
11. 3-Hydroxy-4-bromo-6-methoxy-7-chloroquinophthalone.
12. 3-Hydroxy-4-chloro-6-methoxy-7-chloroquinophthalone.
13. 3-Hydroxy-4-bromo-6-ethoxy-7-chloro-quinophthalone.
14. 3-Hydroxy-4,7-dichloro-6-ethoxyquinophthalone.
15. 3-Hydroxy-4-bromo-6,8-dimethyl-7-bromoquinophthalone.

* * * * *